Sept. 15, 1964 M. K. HAYNES 3,149,312

CRYOGENIC MEMORY DEVICE WITH SHIFTING WORD REGISTERS

Filed May 18, 1960 2 Sheets-Sheet 1

CRYOGENIC MEMORY DEVICE WITH SHIFTING WORD REGISTERS

Filed May 18, 1960 2 Sheets-Sheet 2

INVENTOR.
MUNRO K. HAYNES

BY

*Thomas & Crickenberger*

United States Patent Office 3,149,312
Patented Sept. 15, 1964

3,149,312

CRYOGENIC MEMORY DEVICE WITH SHIFTING WORD REGISTERS

Munro K. Haynes, Poughkeepsie, N.Y., assignor to International Business Machines Corporation, New York, N.Y., a corporation of New York Filed May 18, 1960, Ser. No. 29,898
6 Claims. (Cl. 340—173.1)

This invention relates to memory devices and more particularly to such devices wherein words stored therein may be operated upon and transferred from one register to another within the memory device.

In various types of computing devices employing memory systems it is customary to read information from the memory, perform operations on the information and return the new information to the memory device. The time involved includes one memory cycle to get the information, another memory cycle to return the information, and enough time to perform operations on the information. Auxiliary equipment external to the memory device is required for storing the information while operations are performed thereon, and this involves in some instances an increase in the cost of manufacture and repair of the computing device. In order to overcome or alleviate some of the foregoing difficulties, this invention provides a memory device wherein information may be operated upon within the memory device, thereby minimizing the time involved in operating upon the information and in some instances reducing the need for auxiliary equipment external to the memory device.

According to this invention information may be shifted to the right or the left within a storage register in the memory device, and a shift of the information to the right or the left may be made simultaneously as the information is transferred from one register to another register in the memory device.

In one arrangement of the invention information is stored in a memory device which includes a plurality of storage registers. Circuits provided for transferring information between registers in memory include shift control circuits which selectively permit shifts to be made to the left or right within a given register or when transferring information between registers.

The flexible memory device of this invention may take numerous forms in practice. It is adaptable to numerous types of bistable storage devices, and it is especially suitable for use with cryotrons and other cryogenic devices. The invention is illustrated herein with the use of cryotrons, but it is to be understood that the invention is not limited to cryotrons or cryogenic devices since other types of bistable storage devices may be equally well employed.

The foregoing and other features of this invention may be more fully appreciated when considered in the light of the following specification and the drawings in which.

Figure 2:
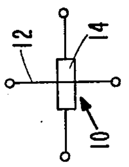
FIG. 2 is a symbol employed throughout FIGS. 3 and 4 to represent the cryotron illustrated in FIG. 1.
Figure 1:
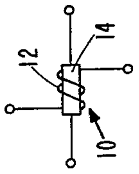
FIG. 1 illustrates a cryotron in schematic form.

Referring first to FIG. 1, a cryotron 10 is illustrated as having a winding 12 disposed about a gate element 14. While this cryotron is represented as a conventional wire-wound cryotron in the interest of providing a more graphic circuit illustration, it is to be understood that the cryotron may be constructed of thin film devices of the type, for example, shown and described in copending application Serial No. 625,512 filed on November 30, 1956 by R. L. Garwin and assigned to the assignee of this invention. The circuit schematic of the cryotron 10 in FIG. 1 is depicted in FIG. 2 in a more simplified form. The same reference numerals employed in FIG. 1 are used in FIG. 2 to designate corresponding parts. The winding 12 in FIG. 1 is represented in FIG. 2 by the vertical conductor 12 disposed across the gate element 14. The simplified legend of FIG. 2 is employed in FIGS. 3 and 4 to represent a cryotron.

The circuits of this invention are operated at low temperature such as by immersion in liquid helium, for example. The circuit lines or wires and the control coils of each cryotron are made of a hard superconductor such as niobium, for instance, and the gate element of each cryotron is made of a soft superconductor such as tantalum, for example. The currents employed create a magnetic field in the control coil which exceeds the critical field of the gate, but the magnetic field does not exceed the critical field of the control coil or the connecting lines or wires. Accordingly, the gate element of the cryotron is driven resistive when current flows in the control coil of the cryotron, and the gate element is superconductive when no current flows in the control coil or when a current of magnitude less than critical current of the gate flows in the control coil.

Figure 4:
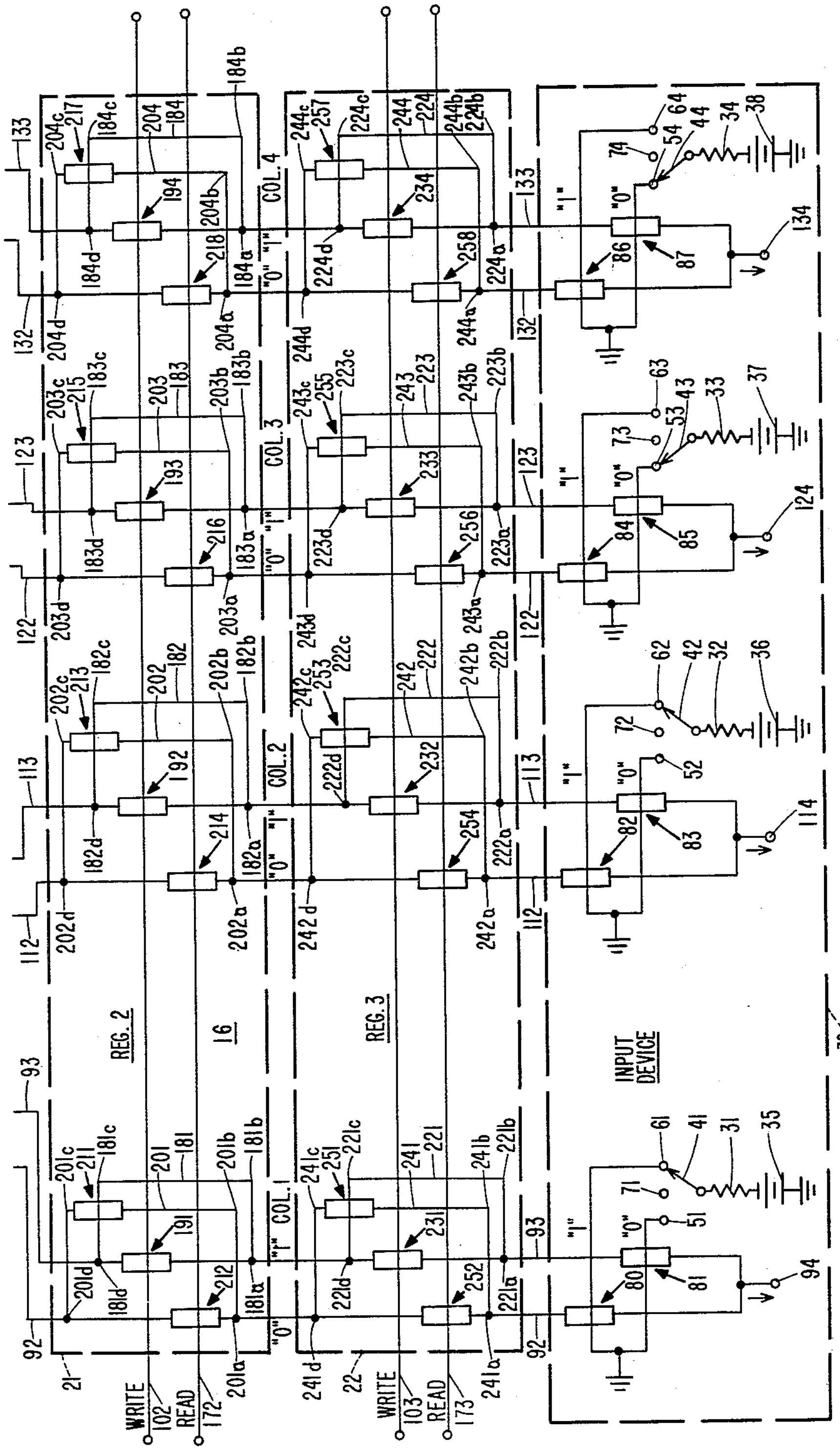
FIGS. 3 and 4 illustrate a memory device constructed according to the principles of this invention.
Figure 3:
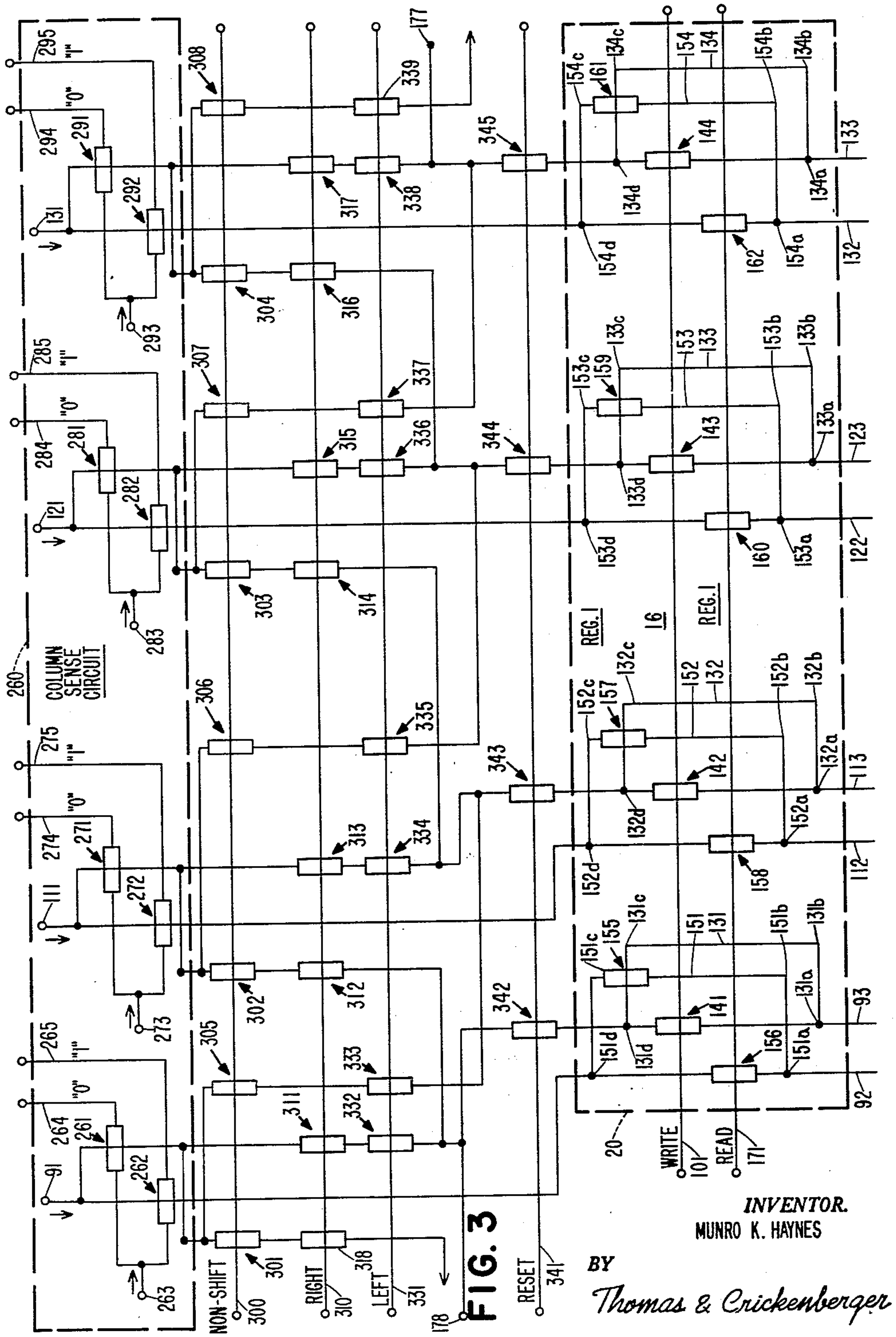

Referring next to FIGS. 3 and 4, an array 16 is illustrated as having registers 20, 21 and 22. It is to be understood that the array 16 may be changed in size as desired by increasing or diminishing the number of registers or the number of storage positions in each register. Information to be written into the array 16 in FIGS. 3 and 4 is supplied by input device 30 which may take numerous forms. The input device 30 is illustrated as having resistors 31 through 34 connected in series with respective batteries 35 through 38 which serve as current sources. Switches 41 through 44 are connected to respective resistors 31 through 34. While the switches 41 through 44 are illustrated as mechanical switches, they may be electrical or electronic devices in practice. The switches 41 through 44 are closed to the right or the left to represent binary information.

For purposes of illustration it is arbitrarily assumed that when the switches are closed to the left a binary zero is represented, and when they are closed to the right a binary one is represented. When the switches 41 through 44 are closed on respective contacts 71 through 74, no information is represented. These switches are normally closed on the respective contacts 71 through 74, and they are switched to the left or to the right to represent binary information when the input device 30 is employed to supply signals representative of information to the array 16. The switch 41 controls battery current supplied to cryotrons 80 and 81, and the switch 42 controls the battery current supplied to the cryotrons 82 and 83. In like fashion, the switch 43 controls the battery current supplied to the cryotrons 84 and 85, and the switch 44 controls the battery current supplied to the cryotrons 86 and 87. Whenever the switch 41 is closed on the contact 61, the gate of the cryotron 80 is driven resistive, and current from a terminal 91 in FIG. 3 is diverted along a line 93 to an exit terminal 94 in FIG. 4. If the switch 41 in FIG. 4 is closed on the contact 51, the gate of the cryotron 81 is driven resistive, and current from the terminal 91 in FIG. 3 is diverted along a line 92 to the exit terminal 94 in FIG. 4. Current on the line 93 represents a binary one, and current on the line 92 represents a binary zero. Information represented by signals on the lines 92 and 93 may be written in column 1 of registers 1, 2 or 3, or in registers 1, 2 and 3, or in any combination of registers 1, 2 and 3, by pulsing the write lines 101, 102 or 103 of respective registers 1 through 3 with a current.

In like fashion, current from a terminal 111 of column 2 in FIG. 3 may be diverted along lines 112 or 113 to an exit terminal 114 in FIG. 4 by operating the switch 42 of the input device 30. Information represented by such signals may be stored in column 2 of register 1, 2 and 3 by energizing the respective write lines 101 through 103 with a current. In a similar fashion current from a terminal 121 of column 3 in FIG. 3 may be diverted along a line 122 or the line 123 to an exit terminal 124 in FIG. 4 by operating the switch 43 of the input device 30. Information represented by such signals on the lines 122 or 123 may be written in registers 1 through 3 by energizing respective write lines 101 through 103 with current. Similarly, current from a terminal 131 of column 4 in FIG. 3 may be diverted along the lines 132 or 133 to an exit terminal 134 in FIG. 4 by operating the switch 44 of the input device 30. Information represented by signals on the lines 132 or 133 may be written in column 4 of registers 1 through 3 by energizing the respective write lines 101 through 103 with current.

It is convenient at this point to describe the construction of registers 1 through 3. Commencing with register 1, it includes storage loops 131 through 134, and each storage loop is a closed loop designated by points *a*, *b*, *c* and *d* associated with the loop number. The storage loops 131 through 134 include respective cryotrons 141 through 144 disposed therein. Each of the storage loops 131 through 134 has a respective one of the sense loops 151 through 154 associated therewith. Each of the sense loops 151 through 154 is a closed loop defined by the points *a*, *b*, *c* and *d* associated with the loop number. The sense loop 151 includes cryotrons 155 and 156 disposed therein, and the sense loop 152 includes cryotrons 157 and 158 disposed therein. The sense loop 153 includes cryotrons 159 and 160 disposed therein, and the sense loop 154 includes the cryotrons 161 and 162 disposed therein. Register 1 is read by pulsing a read line 171 with a current. Registers 2 and 3 are read by pulsing respective read lines 172 and 173 with current.

Register 2 includes storage loops 181 through 184, and each loop is a closed loop defined by the points *a*, *b*, *c* and *d* associated with the loop number. The storage loops 181 through 184 include respective cryotrons 191 through 194 disposed therein. The storage loops 181 through 184 have associated therewith respective sense loops 201 through 204. Each of the sense loops 201 through 204 is a closed loop which is defined by the points *a*, *b*, *c* and *d* associated with the loop number. The sense loop 201 includes cryotrons 211 and 212 disposed therein, and the sense loop 202 includes the cryotrons 213 and 214 disposed therein. The sense loop 203 includes cryotrons 215 and 216 disposed therein, and the sense loop 204 includes the cryotrons 217 and 218 disposed therein.

Register 3 includes storage loops 221 through 224, and each storage loop is a closed loop defined by the points *a*, *b*, *c* and *d* associated with the loop number. The storage loops 221 through 224 include respective cryotrons 231 through 234 disposed therein. The storage loops 221 through 224 are associated with respective sense loops 241 through 244, and each of the sense loops is a closed loop defined by the points *a*, *b*, *c* and *d* associated with the loop number. The sense loop 241 includes cryotrons 251 and 252 disposed therein, and the sense loop 242 includes cryotrons 253 and 254 disposed therein. The sense loop 243 includes cryotrons 255 and 256 disposed therein, and a sense loop 244 includes the cryotrons 257 and 258 disposed therein. For a description of the operation of the storage loops which serve as memory cells reference may be made to the copending application of Munro K. Haynes, Serial No. 30,019, filed May 18, 1960, and assigned to the assignee of the present invention.

Whenever a readout operation takes place from a selected one of the registers 1 through 3, signals representative of information are supplied from columns 1 through 4 to a column sense circuit 260, and from here signals representative of information are supplied to a utilization device not illustrated. The column sense circuit 260 includes an individual sense circuit for each column. The sense circuit for column 1 includes cryotrons 261 and 262 connected to an input terminal 263. Current applied to the terminal 263 flows through the gate of the cryotron 261 to an output line 264, or current from the terminal 263 flows through the gate of the cryotron 262 to an output line 265. Current on the line 264 represents a binary zero, and current on the line 265 represents a binary one. The individual sense circuit for column 2 includes cryotrons 271 and 272 connected to a common input terminal 273. Current applied to the terminal 273 flows through the gate of the cryotron 271 to an output line 274, or it flows through the gate of the cryotron 272 to an output line 275. Current on the line 274 or the line 275 represents a binary zero or a binary one, respectively. The individual sense circuit for column 3 includes cryotrons 281 and 282 connected to a common terminal 283. Current applied to the terminal 283 flows through the gate of the cryotron 281 and along the output line 284 to represent a binary zero, or it flows through the gate of the cryotron 282 down along the line 285 to represent a binary one. The individual sense circuit for column 4 includes cryotrons 291 and 292 connected to a common input terminal 293. Current applied to the terminal 293 flows through the gate of the cryotron 291 and down along a conductor 294 to represent a binary zero, or it flows through the gate of the cryotron 292 and down along a conductor 295 to represent a binary one.

Whenver information is to be transferred from one register to another without shifting to the right or left, a line 300 is energized with current and this drives the gates of the cryotrons 301 through 308 resistive. Whenever information transferred from one register to another is to be shifted right, a line 310 is energized with a current, and this drives the gates of the cryotrons 311 through 318 resistive. When information transferred from one register to another is to be shifted to the left, the line 331 is energized with a current, and this drives the gates of the cryotrons 332 through 339 resistive. Prior to each readout operation a reset line 341 is energized with a current pulse and this drives the gates of the cryotrons 342 through 345 resistive.

In order to illustrate a write operation in the array 16 of FIGS. 3 and 4, let it be assumed the binary word 1100 is to be written in respective columns 1 through 4 of register 3. For this word the switches 41 through 44 of the input device 30 of FIG. 4 are positioned as indicated in the drawing. Accordingly a current is supplied to the cryotrons 80, 82, 85 and 87 of respective columns 1 through 4. As a consequence, current from terminals 91, 111, 121 and 131 flows along respective vertical lines 93, 113, 122 and 132 of respective columns 1 through 4. These currents exit through respective terminals 94, 114, 124 and 134. Next, the write line 103 is energized with a current, and this drives the gates of the cryotrons 231 through 234 resistive. The current in the lines 93 and 113 is thus diverted by the resistance of the gate elements of the respective cryotrons 231 and 232 through the portions of the loops 221 and 222 defined by the points *d*, *c*, *b* and *a* of these respective loops. Because of the resistance of the gate 231 in the loop 221 of column 1, a net flux threading the loop 221 exists which is proportional to the current flowing in that portion of the loop 221*d*, 221*c*, 221*b*, 221*a*.

In like fashion, because of the resistive condition of the gate of the cryotron 232 a net flux in the loop 222 in column 2 exists, which is proportional to the current flowing in that portion of the storage loop 222 in the path defined by the points 222*d*, 222*c*, 222*b* and 222*a*. The storage loops 223 and 224 in respective columns 3 and 4 receive no current, and the resistive condition of the gates of the cryotrons 223 and 234 dissipates any persistent current which may have been present in respective storage loops 223 and 224.

At this point the current on the write line 103 is terminated, and the gates of the cryotrons 231 through 234 revert to their superconductive state. Once these cryotrons return to their superconductive state, the switches 41 through 44 of the input device 30 are returned to respective contacts 71 through 74. As a consequence, no further current is supplied to respective storage loops 221 through 224. Since the net flux threading the loops 223 and 224 is zero, no persistent currents are established in these loops, and this condition is representative of binary zero. The net flux in the storage loops 221 and 222 previously established by the current causes persistent currents to be established in these loops, and these persistent currents are representative of binary one. The persistent current in the loop 221 drives the gate of the cryotron 251 of the sense loop 241 resistive, and the persistent current in the storage loop 222 drives the gate of the cryotron 253 in the sense loop 242 resistive. Since there is no persistent current in the loops 223 and 224, the gates of the cryotrons 255 and 257 in respective sense loops 243 and 244 are superconductive. Accordingly, it is seen that the binary word 1100 is written in respective columns 1 through 4 of register 3. The same binary word may have been written in registers 1 or 2 by energizing the write lines 101 or 102, respectively, in the same manner that write line 103 of register 3 was energized. Furthermore, any words applied by the input device 30 may be written in any one of the registers 1 through 3 or in any combination of registers 1 through 3, including all three registers, by operating the associated write lines of these registers simultaneously.

Next, a readout operation is described. In order to illustrate a readout operation from a selected one of the registers 1 through 3 through the column sense circuit 260 to a utilization device not illustrated, let it be assumed that register 3 is selected and that the binary word 1100 is stored therein. First, the non-shift line 300 and the reset line 341 are energized with currents, and this drives the gates of the cryotrons 301 through 308 and 342 through 345 resistive. As a consequence, currents from the terminals 91, 111, 121 and 131 are caused to flow in respective lines 92, 112, 122 and 132. At this point the current pulses on the reset line 341 are terminated, and current continues to flow in the superconductive paths defined by the vertical lines 92, 112, 122 and 132 even though the lines 93, 113, 123 and 133 are superconductive. This is because current in one superconductive path does not change to an alternate parallel superconductive path unless forced to do so. Next, the read line 173 of the selected register 3 is energized with a current pulse, and this drives the gates of the cryotrons 252, 254, 256 and 258 of respective sense looops 241 through 244 resistive. The current in the line 92 of column 1 finds the gates of the cryotrons 251 and 252 of the sense loop 241 resistive, and it is diverted from the line 92 to the superconductive line 93.

In like fashion, the current in the vertical line 112 of column 2 finds the gates of the cryotrons 253 and 254 resistive, and it is diverted from the line 112 to the superconductive line 113. The current in the line 122 of column 3 is diverted by the resistive gate of the cryotron 256 in the sense loop 243 through the superconductive gate of the cryotron 255 in the sense loop 243. That is, current from the terminal 121 in FIG. 3 flows along the line 122 to the point **243*d* in FIG. 4, and it then flows around the sense loop 243 through a path defined by the points 243*d*, 243*c*, 243*b* and 243*a* and out along the line 122 to the exit terminal 124. Accordingly, current from the terminal 121 in column 3 of FIG. 3 continues to flow along the line 122 after the read pulse is applied to the read line 173. Current on the line 132 of column 4 finds the gate of the cryotron 258 resistive and the gate of the cryotron 257 superconductive. Accordingly, current on the line 132 is diverted around that portion of the sense loop 244 defined by the points 244*d*, 244*c*, 244*b* and 244*a*. This current then flows out to the exit terminal 134 along the line 132. Thus it is seen that current from the terminal 91, 111, 121 and 131 in FIG. 3 flows along respective lines 93, 113, 122 and 132 to respective exit terminals 94, 114, 124 and 134. The current in the line 93 of column 1 of FIG. 3 drives the gate of the cryotron 261 resistive and diverts the current from the terminal 263 through superconductive gate of the cryotron 262 out along the one output line 265. The current from the terminal 111 of column 2 in FIG. 3 flowing along the vertical line 113 drives the gate of the cryotron 271 resistive and diverts the current from the terminal 273 through the superconductive gate of the cryotron 272 out along the one output line 275. The current from the terminal 121 of column 3 in FIG. 3 flowing along the vertical line 122 drives the gate of the cryotron 282 resistive and diverts the current from the terminal 283 through the superconductive gate of the cryotron 281 out along the zero output line 284. The current from the terminal 131 of column 4 in FIG. 3 flowing along the vertical line 132 drives the gate of the cryotron 292 resistive and diverts the current from the terminal 293 through the superconductive gate of the cryotron 291 out along the zero output line 294. Accordingly, it is seen that the binary word 1100 stored in respective columns 1 through 4 of register 3 is read out along these respective columns through the column sense circuit 260** to a utilization device not illustrated.

As soon as the read operation described above takes place, current on the read line 173 of register 3 may be terminated. The sense current supplied to the terminals 263, 273, 283 and 293 of the column sense circuit 260 may be D.C. signals or pulse signals. In like fashion the signals applied to the terminals 91, 111, 121 and 131 may be D.C. or pulse signals. For purposes of illustration of the operation of the circuits of this invention, it is presumed that pulse signals are employed throughout the circuits illustrated in FIGS. 3 and 4. The pulse signals applied to the terminals 91, 111, 121 and 131 are initiated first, and they are preferably terminated last. The signals applied to the terminals 263, 273, 283 and 293 perform a sensing operation, and they must be initiated before the signals are terminated on the terminals 91, 111, 121 and 131.

From the foregoing illustration of how a word may be read from register 3, it is readily seen that in like fashion a word may be read from either register 1 or register 2. It should be pointed out that whether a read operation or a write operation is performed the information being written or read is represented on one or the other of the vertical lines in each column. For example, information being written into or read from any one of the registers 1 through 3 along column 1 is represented as a binary zero with a current on the vertical line 92 or a binary one with a current on the vertical line 93. It is readily seen therefore that the vertical lines in each column serve as a common bus between corresponding bits or storage positions of each register.

It is not necessary, when writing information in a given register, that the information come from the input device 30, nor is it necessary when reading information from a given register to send this information to an external device, not shown, through the column sense circuit 260. Information may be transferred from one register to another register within the array 16. For example, register 3 may be read out simultaneously as a write operation is performed in register 1. The information read from register 3 is established on the vertical lines in each column, such as the lines 92 and 93 in column 1, and it is this information which is written in register 1 simultaneously. When information is transferred from one register in the array 16 to any other register or combination of registers in the array 16, the non-shift line 300 in FIG. 3 is energized with a current, and this drives the gates of the cryotrons 301 through 308 resistive and prevents information in one column from being shifted to the right or left. The current on the non-shift line 300 is terminated after the transfer is completed, preferably after the currents to the terminals 91, 111, 121 and 131 are terminated.

In order to illustrate the transfer of information from one register to another without a shift to the right or left, let it be assumed that the content of register 1 is to be transferred to register 3. First, current is applied to the terminals 91, 111, 121 and 131. Second, the non-shift line 300 and the reset line 341 are energized with currents, preferably simultaneously. As soon as the current from the terminals 91, 111, 121 and 131 is caused to flow in respective lines 92, 112, 122 and 132, the current pulse on the reset line 341 is terminated. The current on the non-shift line 300 continues until the transfer of information in register 1 is made to register 3. Next, the read line 171 of register 1 and the write line 103 of register 3 are energized with currents, preferably simultaneously. The information in register 1 is represented by currents on the vertical lines of each column, such as the lines 92 and 93 in column 1, for example. It is this information which is written in register 3 by the energization of the write line 103. As soon as this transfer is completed, currents on the write line 103 in register 3 and the read line 171 in register 1 may be terminated. Last, currents to the non-shift line 300 and the terminals 91, 111, 121 and 131 may be terminated because the transfer from register 1 to register 3 is completed.

It is desirable in many instances in computing devices to be able to shift information to the right or the left, and it is especially useful if the shift can be accomplished while transferring from one register to another. Furthermore, it is particularly useful if this shift to the right or the left of information transferred from one register to another can take place within a storage device and thereby avoid the necessity of reading the information from memory to an auxiliary register, perform the shift and return the information to a different register in memory. Information may be transferred from one register to another and shifted one position to the right or the left in the array 16 in FIGS. 3 and 4, and thus the need for auxiliary storage equipment may be dispensed with and the time for performing such an operation reduced when compared to earlier devices for performing the same function. This shifting arrangement is useful, for example, in some types of multiply operations.

In order to illustrate how information is transferred from one register to another and shifted one position to the right or left as the transfer is made, let it be assumed that a word in register 3 is to be shifted one position to the right and stored in register 1. It is to be understood that the number of storage positions in register 1 through 3 may be expanded to the right and the left as desired, and extra positions to the right or left of a word in these registers must be provided to permit shift operations to take place if the shifted word is to be retained entirely in memory. Alternatively, the output of the last stage may be fed as an input to the first stage to provide circulatory shifting, or may be supplied as an input to another device not shown. During a shift left or a shift right operation the extreme stage to the left or right as the case may be must be provided with an input to set the stage properly to either its binary zero or one state in accordance with the operation to be performed. These inputs are applied at terminal 177 during a left shift operation and terminal 178 during a right shift operation.

For purposes of illustration, let it be assumed that the word in register 3 is a two-bit word which is stored in columns 2 and 3. Arbitrarily, let it be assumed that the binary word is 1 0 as stored in respective columns 2 and 3 of register 3. First, the reset line 341 together with either the non-shift line 300 or the right shift line 310 or the left shift line 331 are energized with a current pulse to effect a reset operation, i.e., cause current from the terminals 91, 111, 121 and 131 to flow on respective lines 92, 112, 122 and 132. This same reset operation may be performed instead by pulsing either the right shift line 310 or the left shift line 331 and the non-shift line 300, but the former method may be preferred. The former method is assumed here for purposes of illustration. The pulses on the reset line and the non-shift line are terminated. A pulse is applied to the right shift line 310, and this drives the gates of the cryotrons 311 through 318 resistive. The pulse on the right shift line 310 is maintained for the duration of the transfer operation. Next, the read line 173 of register 3 is energized with a current pulse, and the write line 101 of register 1 may be pulsed simultaneously therewith although the write line 101 may be pulsed subsequently. Energization of the read line 173 of register 3 drives the gates of the cryotrons 252 through 258 resistive.

Considering first column 2 of register 3, the storage loop 222 in FIG. 4 holds a persistent current representing a binary one, the gate of the cryotron 253 is driven resistive. Since the gate of the cryotron 254 is driven resistive by the current pulse on the read line 173, current in the vertical line 112 is diverted therefrom. This current cannot travel on the vertical line 113 because the gate of the cryotron 313 in FIG. 3 is held resistive by the current on the right shift line 310. Accordingly, the current from the terminal 111 flows through the gate of a cryotron 306, then through the gate of the cryotron 335 to the vertical line 123 of column 3. This current flows from the gate of the cryotron 344 to the junction point **133*d* of the storage loop 133. Assuming the write line 101 was earlier energized or, if not, is now energized, the gate of the cryotron 143 is driven resistive, and the current at the junction point 133*d* flows to the right through the loop 133 in a path defined by the points 133*d*, 133*c*, 133*b* and 133*a*. From the point 133*a* the current flows ultimately to the exit terminal 124 in FIG. 4. A net magnetic flux in the storage loop 133 exists because the gate of the cryotron 143 is resistive and current is forced to flow around this cryotron and through the larger portion of the loop 133 defined by the points 133*d*, 133*c*, 133*b* and 133*a***.

Considering next column 3 of register 3, a zero is stored in the storage loop 223, and thus no persistent current is present in this loop. Accordingly, when current on the read line 173 drives the gate of the cryotron 256 resistive, the current on the vertical line 122 flows through the sense loop 243 in a path defined by the points **243*d*, 243*c*, 243*b* and 243*a*. From the point 243*a* current flows to the exit terminal 124. Accordingly, it is seen that current from the terminal 121 in FIG. 3 continues to flow along the vertical line 122 because the storage loop 223 in register 3 holds a binary zero and does not effect a diversion of current from column 3 to column 4. It is pointed out that a current is flowing from the terminal 121 along the vertical line 122 to the exit terminal 124, and a current is flowing from the terminal 111 in column 2 across to the vertical line 123 of column 3 and along the line 123 to the exit terminal 124. It is immaterial for the purpose of writing in register 1 that a current flows in the vertical line 122. It is important that a current flow in the vertical line 123 when a binary one is to be written in column 3 of register 1**.

Considering next columns 1 and 4 of register 3, it is assumed that a zero was stored in the respective storage loops 221 and 224. It is readily seen from the considerations of column 3 above that currents from the terminals 91 and 131 continue to flow in the respective vertical lines 92 and 132. At this point the current on the read line 173 in register 3 and the current on the write line 101 in register 1 may be terminated. Consequently, the gate of the cryotron 143 returns to its superconductive state, but current from the terminal 111 in column 2 continues to flow through that portion of the loop 133 defined by the points **133*d*, 133*c*, 133*b* and 133*a*. Next, currents supplied to the right shift line 310 and to the terminals 91**, 111, 121 and 131 may be terminated, and upon such occurrence a persistent current is established in the storage loop 133 of register 1 while no persistent current is established in the storage loops 131, 132 and 134 in respective columns 1, 2 and 4 of register 1. Accordingly, it is seen that the binary word 1 0 initially positioned in columns 2 and 3 of register 3 are transferred to respective columns 3 and 4 with zeros being inserted in columns 1 and 4 of register 1.

In order to illustrate further a transfer operation from one register to another with a shift to the right or left during the transfer, let it be assumed that a left shift is to take place as a word is transferred from register 3 to register 2. Assume further that the binary word 1 1 is stored in respective columns 2 and 3 of register 3. Zeros are assumed to be in columns 1 and 4, but they will be disregarded for convenience in this illustration as empty positions. First, currents are applied to the terminals 91, 111, 121 and 131 in FIGURE 3. Then reset line 341 and the left shift line 331 are energized with a current pulse. This causes the currents from the terminals 91, 111, 121 and 131 to flow along respective vertical lines 92, 112, 122 and 132. The current on the reset line 341 is terminated. The current applied to the left shift line 331 is maintained throughout the remainder of the transfer operation. A current now is applied to the read line 173 of register 3, and simultaneously or at a subsequent time a current is applied to the write line 102 of register 2. The current on the read line 173 of register 3 drives the gates of the cryotrons 252, 254, 256 and 258 resistive.

Considering first what happens to the one stored in column 2 of register 3, it is noted that the storage loop 222 has a persistent current which drives the gate of the cryotron 253 resistive. The gate of the cryotron 254 is resistive because of the current on the read line 173. Accordingly, the current in the vertical line 112 from the terminal 111 is diverted from the vertical line 112. The current from the terminal 111 in column 2 cannot flow along the vertical line 113 because the gate of the cryotron 334 is held resistive by the current applied to the left shift line 331, and the current from the terminal 111 accordingly flows through the gate of the cryotron 302, the gate of the cryotron 312 to the vertical line 93 in column 1. At this point a current is applied to the write line 102, if it was not earlier applied, and the gate of the cryotron 191 is driven resistive. Accordingly, the current on the vertical line 93 is diverted at the point 181*d* and flows through the larger portion of the storage loop 181 in a path defined by the points 181*d*, 181*c*, 181*b* and 181*a*. From here the current flows to the exit terminal 94. Accordingly, current from the terminal 111 of column 2 is diverted to the vertical line 93 of column 1, and a net flux exists in the storage loop 181 because the gate of the cryotron 191 is driven resistive, diverting the current through the major portion of the loop 181 which is in parallel with the gate of the cryotron 191.

Considering next the storage position in column 3 of register 3, a persistent current in the storage loop 223 drives the gate of the cryotron 255 resistive. The read current on the line 173 of register 3 drives the gate of the cryotron 256 resistive. Accordingly, current must be diverted from the vertical line 122 in column 3. The gate of the cryotron 336 is resistive because of the current in the left shift line 331. Consequently, current from the terminal 121 is diverted through the superconductive gates of the cryotrons 303 and 314 to the vertical line 113 of column 2. From here the current flows to the point 182*d* of the storage loop 182 in column 2 of register 2. The current on the write line 102 drives the gate of the cryotron 192 resistive so that the current in the line 113 is diverted through the storage loop 182 in a path defined by the points 182*d*, 182*c*, 182*b* and 182*a*. From here the current flows to the exit terminal 114. Accordingly, current from the terminal 121 in column 3 is diverted to the vertical line 113 in column 2. There is a net flux in the loop 182 because the gate of the cryotron 192 is resistive and the current is diverted through the major portion of the loop 182 which is in parallel with the gate of the cryotron 192. At this point the current on the read line 173 may be terminated. Also, the current on the write line 102 may be terminated. Subsequent to the termination of the current on the write line 102 the currents supplied to the left shift line 331 and to the terminals 91, 111, 121 and 131 may be terminated at which time persistent currents are established in the storage loops 181 and 182 in respective columns 1 and 2 of register 2, representing the binary information 11. It is seen therefore that the binary word 1 1 is transferred from respective columns 2 and 3 of register 3 to respective columns 1 and 2 of register 2.

In order to illustrate a shift operation within the same register in memory, let it be assumed that a right shift operation is to take place in register 3 and that the binary word 1 1 is stored in respective columns 2 and 3 of register 3. Zeros are assumed in columns 1 and 4 of register 3, but they are assumed to be empty positions. First, currents are applied to the terminals 91, 111, 121 and 131 in FIG. 3. Next, currents are applied to the right-shift line 310 and the reset line 331 to effect a reset operation, i.e., cause the currents from the terminals 91, 111, 121 and 131 to flow on respective vertical lines 92, 112, 122 and 132. Once the currents are established on these lines, the current pulses on the reset line 331 may be terminated. The current applied to the right shift line 310 is maintained throughout the remainder of the shift operation. Next a read current is applied to the line 173 of register 3 in FIG. 4.

Considering first what happens in column 3 of register 3, the gate of the cryotron 255 is driven resistive by the persistent current circulating in the storage loop 223. The gate of the cryotron 256 is driven resistive by the current in the read line 173. Accordingly, the current in the vertical line 122 is diverted therefrom. Since the gate of the cryotron 315 in column 3 of FIG. 3 is driven resistive by the current on the right shift line 310, the current from the terminal 121 of column 3 is diverted through the gate of the cryotron 307. Because the gate of the cryotron 314 is driven resistive by the current on the right shift line 310, the current from the gate of the cryotron 307 flows through the gate of the cryotron 337 to the vertical line 133 of column 4. This current flows to the point 224*d* in register 3 of column 4 and divides in the parallel paths of the storage loop 224 inversely proportional to the inductive impedance thereof. A major portion of the current flows through the gate of the superconductive cryotron 234 to the point 224*a*, and a smaller portion flows in the alternate path of the loop 224 defined by the points 224*d*, 224*c*, 224*b* and 224*a*. From the point 224*a* the current flows to the exit terminal 134. Accordingly, it is seen that the current from the terminal 121 in column 3 is diverted to the vertical line 133 in column 4.

Considering next what happens in column 2 of register 3, the gate of the cryotron 253 is driven resistive by the persistent current circulating in the storage loop 222. The gate of the cryotron 254 is driven resistive by the current in the read line 173. Accordingly, current from the terminal 111 is diverted from the vertical line 112. Since the current on the right shift line 310 holds the gates of the cryotrons 312 and 313 resistive, the current from the terminal 111 flows to the left down through the superconductive gate of the cryotron 302, then to the right and down through the superconductive gate of the cryotron 335 over to the vertical line 123 of column 3. From here the current flows to the junction point 223*d* in register 3 and divides inversely proportional to the inductance of the alternate paths of the storage loop 223. A major portion of the current flows through the gate of the superconductive cryotron 233, and a smaller portion flows through the portion of the storage loop 223 defined by the points 223*d*, 223*c*, 223*b* and 223*a*. From the point 223*a* the current flows to the exit terminal 124. That portion of the current in the vertical line 123 flowing through the superconductive gate of the cryotron 233 is opposed by the persistent circulating current, and effectively the current through that portion of the loop 223 defined by the points 223*d*, the gate of the cryotron 233 and the point 223*a* is substantially zero. That portion of the current in the vertical line 123 which flows through the major portion of the storage loop 223 defined by the points 223*d*, 223*c*, 223*b* and 223*a* aids the persistent circulating current in this portion. Accordingly, the total current flowing through that portion of the loop 223*d*, 223*c*, 223*b* and 223*a* is substantially equal to the magnitude of the current flowing along the vertical line 123 to the point 223*d*. It is seen therefore that the current from the terminal 111 in column 2 is diverted to the vertical line 123 in column 3.

At this point the current applied to the read line 173 is terminated and the write line 103 is energized with current. The gates of the cryotrons 231 through 234 are thus driven resistive. The resistive condition of the gate of the cryotron 232 in column 2 of register 3 dissipates the persistent current circulating in the storage loop 222. In column 3 of register 3 the gate of the cryotron 233 becomes resistive. Consequently, no current is permitted to flow through that portion of the loop 223 defined by the point 223*d*, the gate of the cryotron 233 and the point 223*a*. Instead, all of the current flowing along the vertical line 123 to the point 223*d* is diverted around the loop 223 in a path defined by the points 223*d*, 223*c*, 223*b* and 223*a*. From the point 223*a* the current passes to the exit terminal 124. In column 4 of register 3 the resistive gate of the cryotron 234 diverts all of the current in the line 133 flowing to the loop 224 so that it flows through loop points *d*, *c*, *b* and *a* to exit terminal 134. At this point the current on the write line 103 may be terminated. Consequently, persistent currents are established in the storage loops 223 and 224 of respective columns 3 and 4 of register 3. No persistent current is established in the storage loop 222 of column 2. The storage loop 221 of column 1 contains a zero when the shift operation is commenced, and if no current is supplied at terminal 178 it contains a zero upon the completion of the shaft operation. It is seen, therefore, that the binary word 1 1 in the respective columns 2 and 3 of register 3 before the shift operation is transferred to respective columns 3 and 4 upon completion of the shift operation. At this point the current on the right shift line 310 and the currents applied to the terminals 91, 111, 121 and 131 may be terminated. In case a left shift operation has to take place, the foregoing sequence of events explained with respect to a right shift operation are repeated except the left shift line 331 is energized with the current instead of a right shift line 310. It is felt that a left shift operation need not be explained in detail since the sequence of events is evident from the foregoing description of a right shift operation.

Accordingly, there is provided according to this invention a memory device in which words stored therein may be shifted to the right or to the left in the same register in memory, or a word may be shifted to the right or the left as the information is transferred from any one register in the memory device to any other register in the memory device.

What is claimed is:

1. A cryogenic memory array comprising first and second pairs of conductors forming columns in said array and third and fourth pairs of conductors forming rows in said array, an input device coupled to said first and second pairs of conductors for energizing selectively certain of said conductors in a desired pattern, storage means connected to one conductor of each of said first and second pairs of conductors for storing information therein, sense means connected to each of the other conductors of said first and second pairs of conductors for sensing the presence of information in said storage means, output means coupled to said first and second pairs of conductors for indicating the information stored, means connecting said one conductors of said first and second pairs of conductors, and shift control means coupled to each of said one conductors and to said means connecting said one conductors of said first and second pairs of conductors, whereby information may be read from said array while the information is being transferred simultaneously to another position within the array.

2. The combination according to claim 1 wherein said storage means and said sense means comprise superconductive loops coupled to each other by cryotron devices.

3. The combination according to claim 2 wherein said sense loops contain cryotron gate elements and the associated storage loops contain the corresponding cryotron control elements.

4. The combination according to claim 1 wherein said means connecting said one conductors of said first and second pairs of conductors include cryotron gate elements which are controlled by said shift control means to cause information to be shifted to the right, to the left, or not to be shifted at all.

5. The combination according to claim 1 wherein one of each of said third and fourth pairs of conductors is coupled to each of said other conductors of said first and second pairs of conductors and the other of each of said third and fourth pairs of conductors is coupled to each of said one conductors of said first and second pairs of conductors.

6. The combination according to claim 5 wherein the coupling is accomplished by cryotron devices having gate elements in said first and second pairs of conductors and corresponding control elements in said third and fourth pairs of conductors.

References Cited in the file of this patent

UNITED STATES PATENTS

| | | |
|---|---|---|
| 2,884,621 | Ross | Apr. 28, 1959 |
| 2,888,201 | Housman | May 26, 1959 |
| 2,902,217 | Davis | Sept. 1, 1959 |
| 3,019,353 | Mackay | Jan. 30, 1962 |
| 3,026,499 | Chaimowicz | Mar. 20, 1962 |